United States Patent
Tackmann et al.

(10) Patent No.: US 12,253,645 B2
(45) Date of Patent: Mar. 18, 2025

(54) DOWNHOLE COMPONENT MAGNETIC PROPERTY ESTIMATION

(71) Applicant: Baker Hughes Oilfield Operations LLC, Houston, TX (US)

(72) Inventors: Gunnar Tackmann, Niedersachsen (DE); Alexander Mayer, Niedersachsen (DE); Veronica Vanessa Herrera Bano, Niedersachsen (DE); Dominik Hoheisel, Niedersachsen (DE)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 53 days.

(21) Appl. No.: 18/172,779

(22) Filed: Feb. 22, 2023

(65) Prior Publication Data
US 2024/0280722 A1    Aug. 22, 2024

(51) Int. Cl.
G01V 3/26    (2006.01)
E21B 47/092    (2012.01)

(52) U.S. Cl.
CPC .............. *G01V 3/26* (2013.01); *E21B 47/092* (2020.05)

(58) Field of Classification Search
None
See application file for complete search history.

(56) References Cited

U.S. PATENT DOCUMENTS

| | | |
|---|---|---|
| 2002/0112856 A1 | 8/2002 | Van et al. |
| 2016/0047228 A1 | 2/2016 | Frosell et al. |
| 2017/0081954 A1* | 3/2017 | Dewald .................. E21B 33/03 |
| 2020/0131898 A1 | 4/2020 | Wu et al. |
| 2021/0040839 A1 | 2/2021 | Tackmann et al. |
| 2022/0243583 A1 | 8/2022 | Seren et al. |

OTHER PUBLICATIONS

International Search Report for International Application No. PCT/US2024/015100, International Filing Date Feb. 9, 2024, Date of Mailing Jun. 12, 2024, 3 pages.
Written Opinion for International Application No. PCT/US2024/015100, International Filing Date Feb. 9, 2024, Date of Mailing Jun. 12, 2024, 5 pages.

* cited by examiner

*Primary Examiner* — Jas A Sanghera
(74) *Attorney, Agent, or Firm* — CANTOR COLBURN LLP

(57) ABSTRACT

A method of estimating a magnetic property of a downhole component includes measuring a magnetic field strength of the downhole component at a plurality of axial locations along the downhole component to generate a plurality of magnetic field strength measurements, each magnetic field strength measurement taken in a near field region of the downhole component, and analyzing the magnetic field measurements to estimate a magnetic signature of the downhole component. The method also includes estimating an expected maximum pole strength of the downhole component based on the magnetic signature, and configuring the downhole component in a borehole string based on the expected maximum pole strength.

20 Claims, 4 Drawing Sheets

DOWNHOLE COMPONENT MAGNETIC PROPERTY ESTIMATION

BACKGROUND

In the resource recovery industry and fluid sequestration industry, various types of borehole strings, components and tools are deployed in a borehole for exploration and production of hydrocarbons. A drill string generally includes drill pipe or other tubular and a bottomhole assembly (BHA). Many drilling operations utilize directional measurements in conjunction with a steering assembly or system to direct a borehole along a desired path, e.g., to target specific formations or productive subterranean regions. Such measurements include magnetometer measurements such as magnetic toolface and azimuth.

Tools or components can be magnetized downhole, and magnetization states can vary from tool to tool, depending on magnetic properties and tool history (e.g., exposure to magnetic fields during manufacturing, handling, operations, inspection and repair). Such magnetization can create magnetic cross-axial and axial interference on directional magnetometer signals, leading to errors in the estimation of directional data (e.g., magnetic tool face and magnetic azimuth).

SUMMARY

An embodiment of a method of estimating a magnetic property of a downhole component includes measuring a magnetic field strength of the downhole component at a plurality of axial locations along the downhole component to generate a plurality of magnetic field strength measurements, each magnetic field strength measurement taken in a near field region of the downhole component, and analyzing the magnetic field measurements to estimate a magnetic signature of the downhole component. The method also includes estimating an expected maximum pole strength of the downhole component based on the magnetic signature, and configuring the downhole component in a borehole string based on the expected maximum pole strength.

An embodiment of a system for estimating a magnetic property of a downhole component includes a processing device configured to receive a plurality of magnetic field strength measurements taken along the downhole component and in a near field region of the downhole component, each magnetic field strength measurement taken at one of a plurality of axial locations along the downhole component. The processing device is configured to analyze the magnetic field measurements to estimate a magnetic signature, and estimate an expected maximum pole strength of the downhole component based on the magnetic signature, the expected maximum pole strength estimated for configuring the downhole component in a borehole string.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
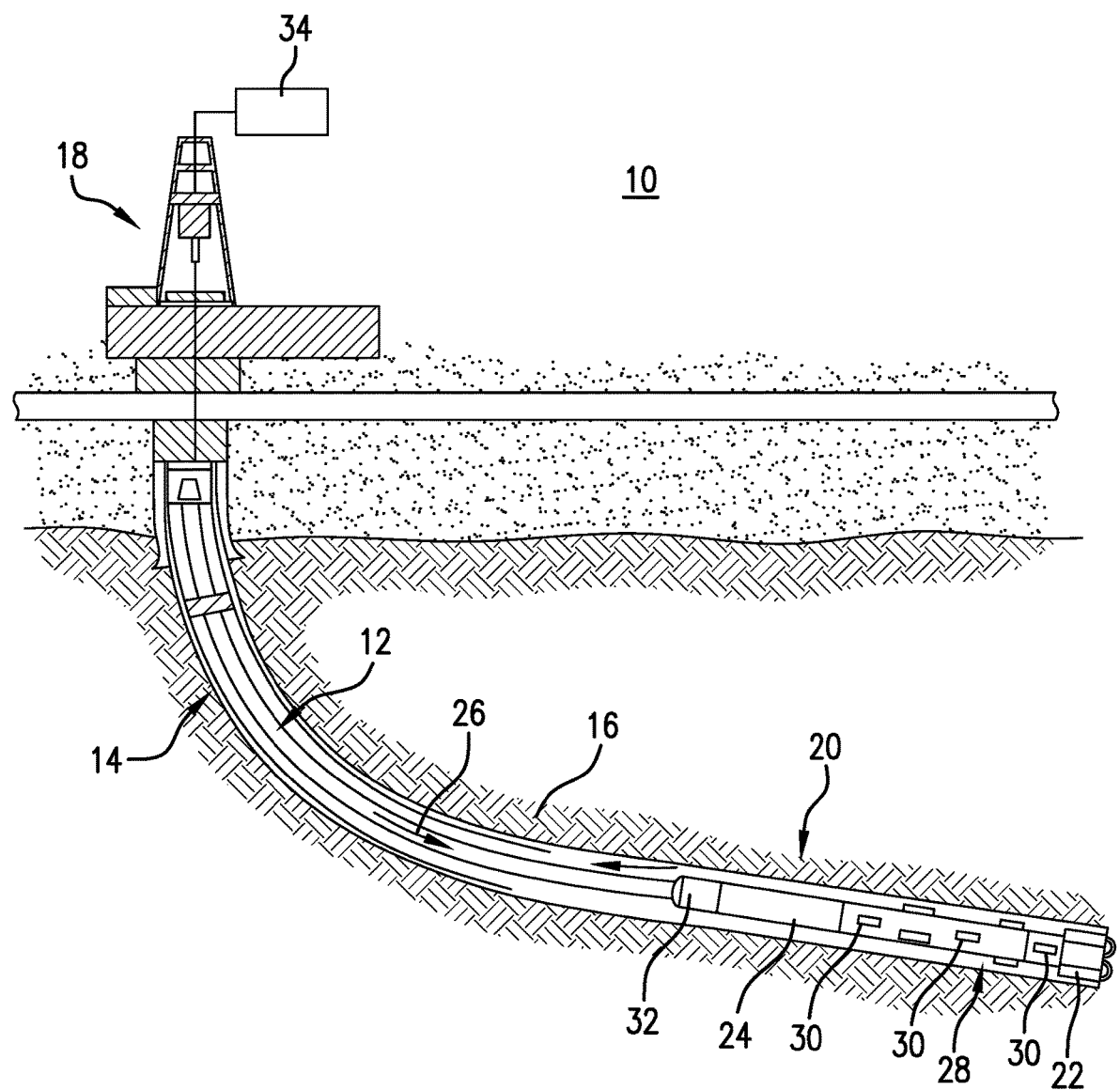
FIG. 1 depicts an embodiment of a drilling and steering system.

Methods, systems and apparatuses for estimating magnetic properties of a downhole component are described herein. An embodiment of a method includes recording radial magnetic field measurements at a plurality of axial locations along the component. An "axial location" is a location along a longitudinal axis of the component. A "radial" measurement is a measurement performed at a selected radial distance from a surface of the downhole component. The magnetic field strength measurements are analyzed to estimate a predominant dipole shape of the component by deriving a magnetic field signature from the magnetic field measurements under an assumption that the magnetic signature is a dipole along the longitudinal axis. The method also includes acquiring reference magnetic field signatures based on magnetic field measurements of a plurality of similar downhole components, and estimating an expected maximum pole strength of the component. The expected maximum pole strength may be used as an expectation value to inform configuring the downhole component relative to one or more magnetic field sensors in a borehole string.

Embodiments described herein provide a number of advantages and technical effects. For example, the embodiments allow for deriving expectation values with greater flexibility and reduced time requirements as compared to current techniques.

Tools and components that are made of magnetic steel undergo different magnetization processes. Some processes have the potential to change the state of a component's magnetization during downhole operations (e.g., running a tool on magnetized neighboring BHA components, running the tool through magnetized surface structures and casing, and/or rotating the tool in the earth magnetic field). Other processes occur before deployment of the tool, for example, due to transport and handling, and manufacturing, inspection and repair operations (e.g., galvanic plating processes or magnetic particle inspection). Furthermore, manufacturing, inspection and repair processes can involve very high currents and magnetic fields, which can lead to remnant magnetization. As a result, the magnetization state and therefore the magnetic interference created by a downhole tool type can vary largely over a fleet of tools of the same type.

Magnetic interference and related azimuth uncertainty are typically managed during job preparation procedures based on expectation values that are representative for the type of downhole tool or component. However, determining such expectation values using current techniques is time-consuming and generally only possible at specific sites (verified non-magnetic field sites) and with trained personnel.

Embodiments address this problem by providing a less complex and more robust method for determining an upper bound on the expected magnetic interference impact from an individual tool or component, as compared to current techniques. This upper bound is determined by the embodiments as a maximum expected pole strength of a component. The methods described herein can be performed using measurements and analysis that are much simpler than current methods. In addition, embodiments of the methods described herein utilize near field measurements, which have higher magnitudes and are less perturbed by background magnetic field perturbations as compared to far field measurements used in current methods. The near field measurements described herein provide for greater flexibility and reduced cost, as such measurements can be performed in standard shop and rig site environments.

FIG. 1 shows an embodiment of system 10 that can be used to performing a subterranean operation (e.g., drilling, measurement, stimulation and/or production). The system 10 includes a borehole string 12 that is shown disposed in a well or borehole 14 that penetrates at least one subterranean region (e.g., hydrocarbon-bearing earth formation) during a drilling or other operation.

The borehole string 12 is operably connected to a surface structure or surface equipment such as a drill rig 18. In one embodiment, the borehole string 12 is a drill string connected to one or more downhole components (e.g., downhole tools), which may be configured as a bottomhole assembly (BHA) 20. The BHA 20 includes a drill bit 22, which in this embodiment is driven from downhole, e.g., by a downhole mud motor 24. The system 10 may include components to facilitate circulating fluid 26 such as drilling mud through the borehole string 12 and the borehole 14

The system 10 includes a steering assembly 28 configured to steer or direct a section of the borehole string 12 and the drill bit 22 along a selected path. Examples of steering assemblies include steerable motor assemblies (e.g., bent housing motor assemblies), whipstocks, turbines and rotary steerable systems.

The system 10 also includes a controller configured to operate the steering assembly 28 based on directional information derived from directional sensors located in the borehole string 12. The directional sensors include, for example, one or more gyroscopes (gyroscope sensors or earth rate sensor sensors), one or more magnetometers (magnetic field sensors) and/or one or more accelerometers (acceleration sensors). For example, one or more sensor assemblies 30 are configured to perform measurements of parameters related to the position and/or direction of the borehole string 12, drill bit 22 and/or the steering assembly 28. The sensor assemblies 30 may be located at one or more of various locations, such as on the steering assembly 28, at or near the drill bit 22 and/or on other components of the borehole string 12 and/or BHA 24.

One or more downhole components and/or one or more surface components may be in communication with and/or controlled by a processor such as a downhole processor 32 and/or a surface processing unit 34. The surface processing unit 34 (and/or the downhole processor 32) may be configured to perform functions such as controlling drilling and steering, controlling the flow rate and pressure of borehole fluid, controlling weight on bit (WOB), transmitting and receiving data, processing measurement data, and/or monitoring operations of the system 10.

In the embodiment of FIG. 1, the system 10 is configured to perform a drilling operation and a downhole measurement operation, and the borehole string 12 is a drill string. However, embodiments described herein are not so limited and may have any configuration suitable for performing a subterranean operation.

Figure 2:
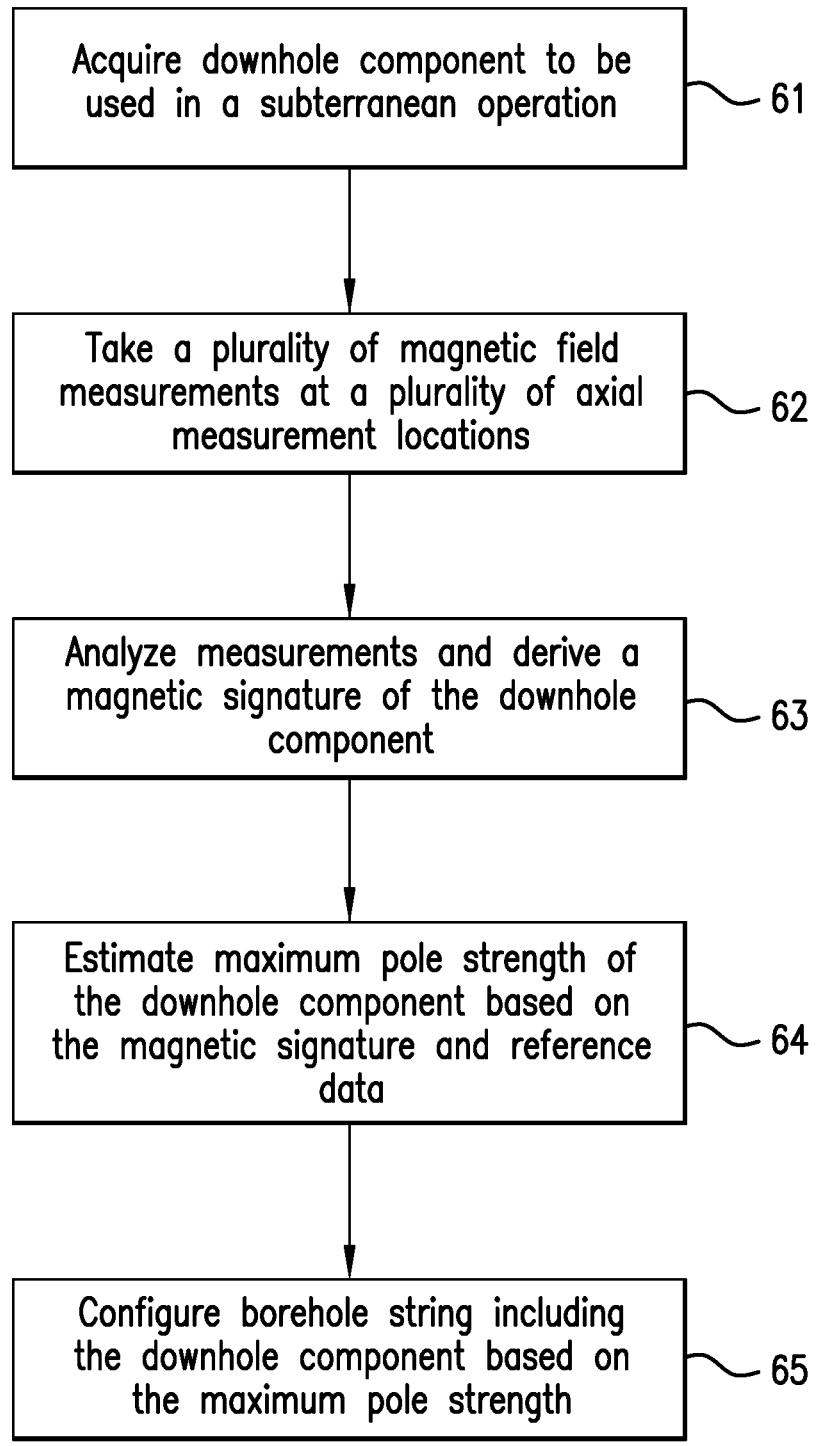
FIG. 2 is a flow chart that depicts an embodiment of estimating a magnetic property of a downhole component, which includes estimating an expected maximum pole strength of the downhole component.

FIG. 2 is a flow diagram representing a method 60 of estimating a magnetic property or properties of a downhole component. The method 60 includes a plurality of method steps or stages, represented by blocks 61-65. The method 60 may include all of the stages or steps in the order described. However, certain stages or steps may be omitted, stages may be added, or the order of the stages changed.

The method 60 is discussed in conjunction with the mud motor 24 for illustration purposes. However, the method 60 may be used to estimate magnetic properties of any desired downhole component(s). In addition, aspects of the method 60 may be performed using any suitable processing device or system (e.g., the surface processing unit 34, a processing device at the rig site and/or a remote processing device (e.g., in a server or workstation).

At block 61, a downhole component (e.g., the mud motor 24) is acquired, which is to be deployed in a subterranean region as part of a borehole string (e.g., the borehole string 12). Any downhole tool that could be magnetized downhole and affect downhole magnetic field readings can be acquired. The downhole component may be a pipe segment, BHA, steering tool, stabilizer, drill bit or drilling assembly, or any other suitable component. In an example, the downhole component is a drilling motor, such as the motor 24.

At block 62, the downhole component is disposed in a non-magnetic environment or low magnetic field environment, such as a workshop or rig site. A plurality of radial magnetic field strength measurements are taken at a plurality of axial locations along the downhole component. Each axial location may be defined from a reference location, such as a location at an end of the component. In an embodiment, each magnetic field strength measurement is taken at in a near field region relative to the component. A "near field" region is a region around the downhole component in which background magnetic fields do not significantly affect the magnetic field measurements, or have a known effect on the magnetic field measurements. Each magnetic field strength measurement is thus taken at a surface of the region and/or within a radial distance from the surface that is within the near field region. An example of a near field region is a region with a radial distance from the surface between about zero and about 5 millimeters (mm).

Figure 3:
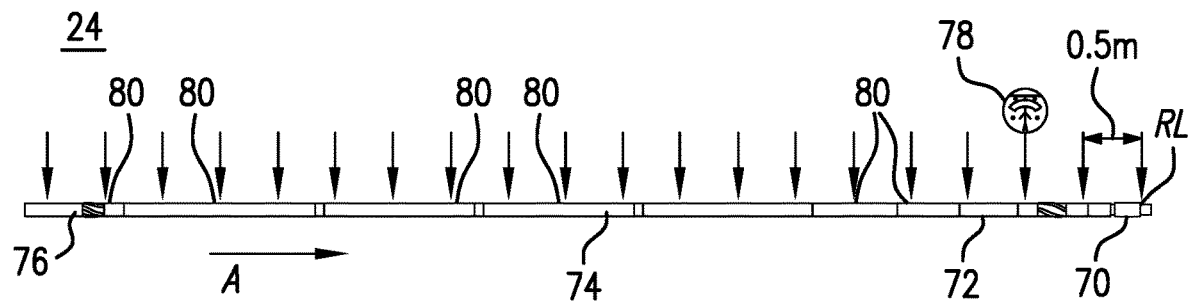
FIG. 3 depicts an example of a downhole component and illustrates an example of magnetic field measurements used to estimate an expected maximum pole strength.

FIG. 3 shows an example of the mud motor 24 and an example of radial magnetic field strength measurements. In this example, the mud motor 24 includes a bottom shoulder 70 for connecting the mud motor 24 to the steering assembly 28, a stabilizer section 72, a power section 74 and a top sub 76.

As shown in FIG. 3, a plurality of radial measurements are taken using a handheld gaussmeter 78 at a plurality of axial measurement locations 80 at the surface of the mud motor in 0.5 meter increments. The total length of the mud motor 24 is about 9.77 meters (m) A measurement location at the shoulder 60 is designated as a reference location RL, and each measurement location is defined as an axial distance (i.e., along a longitudinal axis A of the mud motor 24) from the reference location RL. The measurements may be taken manually by a hand-held magnetometer as shown, or automatically via a mechanical or robotic measurement system.

At block 63, the measurements are analyzed to derive a magnetic signature for the downhole component. The magnetic signature, in an embodiment, is based on identifying one or more magnetic field strength peaks (i.e., maximum or minimum values). For example, the magnetic signature is a maximum or minimum magnetic field strength. In an embodiment, the magnetic signature is a difference between magnetic field strength at a maximum peak and a magnetic field strength, referred to herein as a "peak-to-peak" magnetic field strength.

Figure 4:
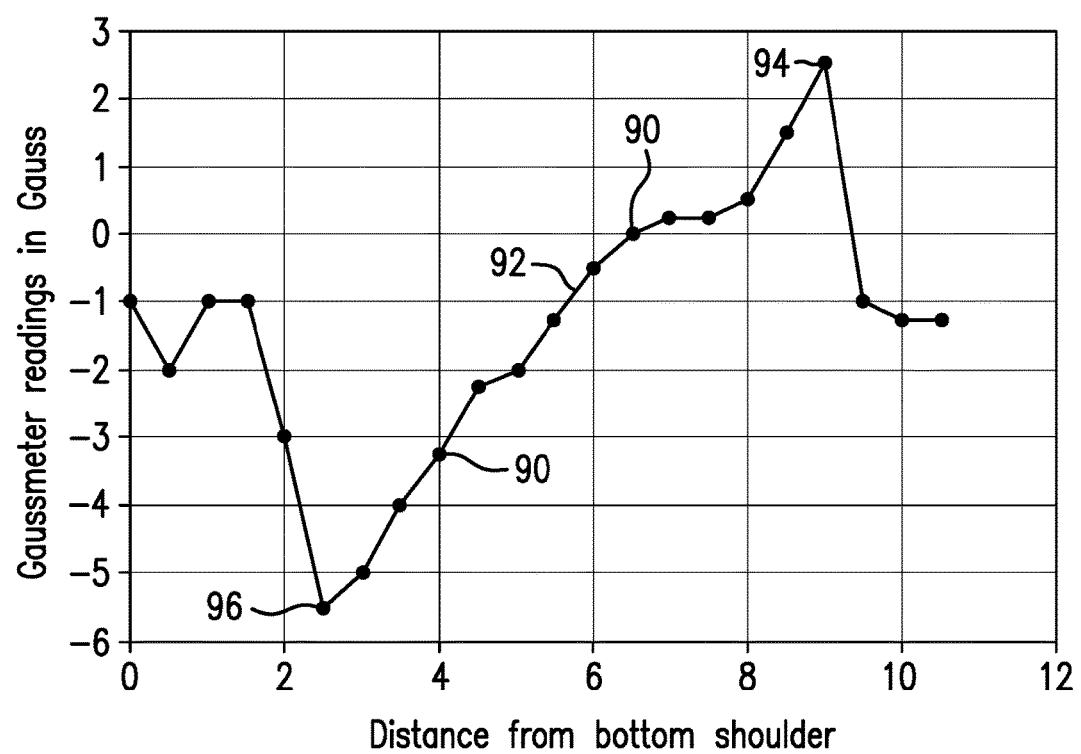
FIG. 4 depicts an example of a magnetic signature of the downhole component of FIG. 3, which is derived from the magnetic field measurements.

FIG. 4 depicts an example of an estimation or derivation of a magnetic signature. In this example, the magnetic signature is a peak-to-peak magnetic field strength. FIG. 4 includes a graph of magnetic field measurements as a function of measurement location 80 (defined as a distance from the bottom shoulder reference location RL). Data points 90 indicate the magnetic field strength measurement at each measurement location, and define a curve 92. As shown, the curve 92 includes two peaks: a maximum value 94 and a minimum value 96. A peak-to-peak magnetic field strength is estimated as the difference between the maximum value 94 and the minimum value 96.

At block 64, an expected maximum pole strength of the downhole component is estimated by comparing the magnetic signature to reference data indicative of magnetic properties of similar downhole components. A component that is "similar" to a given component may be a component of the same type (e.g., drilling motor), a component having the same dimensions as the given component (or dimensions within a selected range of the given component), and/or a component having similar magnetic properties. The maximum pole strength may be used as an expectation value in configuring a borehole string (e.g., positioning the mud motor or component relative to magnetically sensitive portions such as portions including magnetic field sensors).

The reference data may be a lookup table (LUT), graph or other data structure that relates the magnetic signature of the similar components to estimations of magnetic pole strength. The maximum pole strength may be correlated to a curve or function determined by analyzing the magnetic signature and pole strength data for the similar components.

In an embodiment, the reference data includes peak-to-peak strength values related to pole strength estimations for each similar component. The reference data is analyzed to determine a correlation curve or function that allows a measured magnetic signature to be correlated with the expected maximum pole strength of the component.

In an embodiment, the reference magnetic signature and pole strength data is fit to a line or curve, and a measured peak-to peak value is compared to the curve to determine a maximum pole strength. The fitted line or curve, in an embodiment, is determined under a condition that no reference data points occur under the line or curve.

Figure 5:
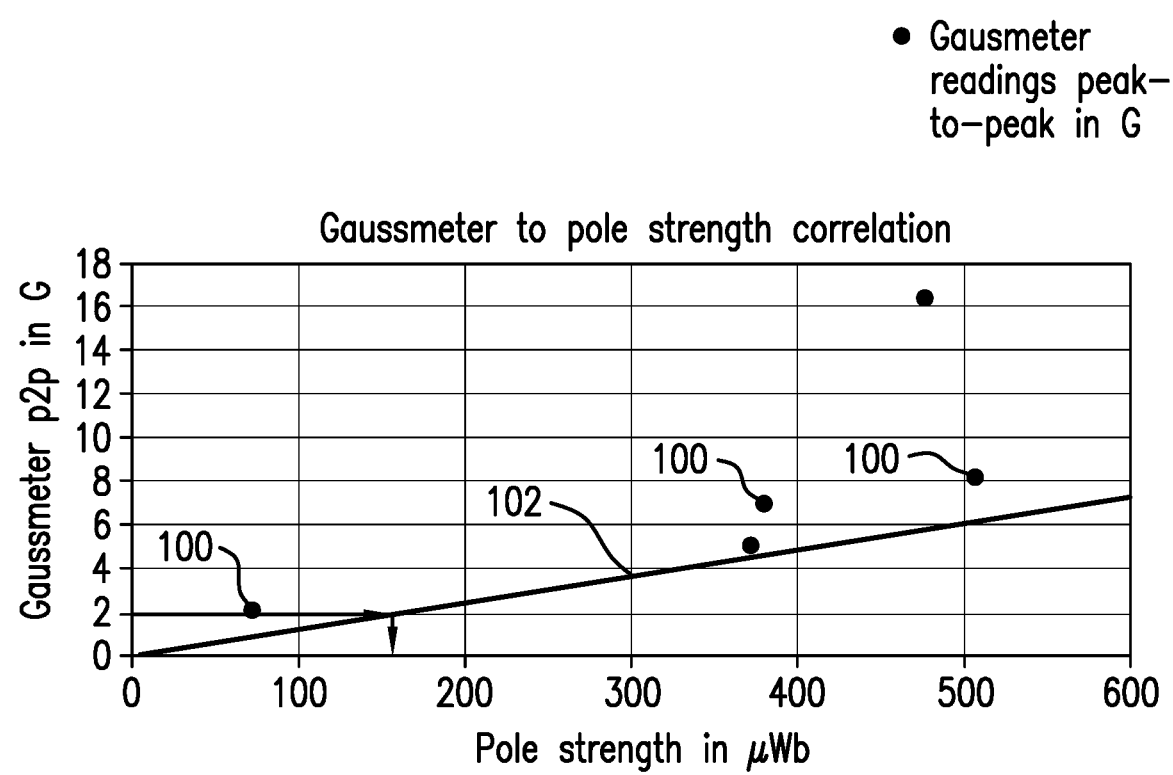
FIG. 5 depicts an example of reference data used to estimate an expected maximum pole strength.

FIG. 5 shows an example of reference data acquired from mud motors of the same type as the mud motor 24. The reference data is shown as a graph of peak-to-peak values (magnetic signatures) as a function of pole strength for a plurality of similar mud motors. The graph shows reference data points 100 and a curve fit in the form of a line 102 that represents a correlation between maximum pole strength and peak-to-peak magnetic strength values. As shown, the line 102 is fit such that an area is established under the line 102 that has no data points. In this example, if the measured peak-peak magnetic strength value is about 2.0 Gauss (G), the maximum pole strength is estimated to be about 160 micro-Webers (uWb).

At block 65, a borehole string is configured for a subterranean operation. The string is configured based on the maximum pole strength to reduce or minimize potential magnetic interference due to magnetization of the downhole component. The configured borehole string can then be used to perform a subterranean operation.

In an embodiment, the maximum pole strength is used as an expectation value to inform the placement of the downhole component relative to magnetic sensors and/or other components that are sensitive to magnetic interference from the downhole component. For example, the maximum pole strength of the mud motor 24 is used to place the mud motor 24 in the borehole string 12 such that the mud motor 24 is sufficiently far from the magnetic sensors 30 to avoid significant interference in the event that the mud motor 24 is magnetized because of downhole conditions. The maximum pole strength can also be used to determine whether to include other components, such as non-magnetic collars.

Set forth below are some embodiments of the foregoing disclosure:

Embodiment 1: A method of estimating a magnetic property of a downhole component, comprising: measuring a magnetic field strength of the downhole component at a plurality of axial locations along the downhole component to generate a plurality of magnetic field strength measurements, each magnetic field strength measurement taken in a near field region of the downhole component; analyzing the magnetic field measurements to estimate a magnetic signature of the downhole component; estimating an expected maximum pole strength of the downhole component based on the magnetic signature; and configuring the downhole component in a borehole string based on the expected maximum pole strength.

Embodiment 2: The method as in any prior embodiment, wherein the borehole string includes a magnetic field sensor, and configuring the downhole component includes positioning the downhole component at a selected distance from the magnetic field sensor based on the expected maximum pole strength.

Embodiment 3: The method as in any prior embodiment, further comprising deploying the borehole string and performing a subterranean operation.

Embodiment 4: The method as in any prior embodiment, wherein each magnetic field measurement is taken at a same radial direction and radial distance within the near field region.

Embodiment 5: The method as in any prior embodiment, wherein the near field region includes a surface of the downhole component.

Embodiment 6: The method as in any prior embodiment, wherein analyzing the magnetic field measurements includes identifying a first peak magnetic field value and a second peak magnetic field value, and estimating the magnetic signature is based on a difference between the first peak magnetic field value and the second peak magnetic field value.

Embodiment 7: The method as in any prior embodiment, wherein the first peak magnetic field value is a maximum magnetic field value and the second peak magnetic field value is a minimum magnetic field value, or the second peak magnetic field value is the maximum magnetic field value and the first peak magnetic field value is the minimum magnetic field value.

Embodiment 8: The method as in any prior embodiment, wherein the estimating the maximum expected pole strength includes comparing the magnetic signature to magnetic field data acquired from a plurality of similar downhole components.

Embodiment 9: The method as in any prior embodiment, wherein the magnetic field data includes a reference magnetic signature for each of the similar downhole components, each reference magnetic field signature being a function of an estimated magnetic pole strength of a respective similar downhole component.

Embodiment 10: The method as in any prior embodiment, wherein the correlating includes generating a reference curve based on the reference magnetic signatures, and estimating the expected maximum pole strength is estimated based on a reference curve generated based on the reference magnetic field signatures.

Embodiment 11: A system for estimating a magnetic property of a downhole component, comprising: a processing device configured to receive a plurality of magnetic field strength measurements taken along the downhole component and in a near field region of the downhole component, each magnetic field strength measurement taken at one of a plurality of axial locations along the downhole component, the processing device configured to: analyze the magnetic field measurements to estimate a magnetic signature; and estimate an expected maximum pole strength of the downhole component based on the magnetic signature, the expected maximum pole strength estimated for configuring the downhole component in a borehole string.

Embodiment 12: The system as in any prior embodiment, wherein the borehole string including the downhole component is configured to be deployed in a borehole and perform a subterranean operation.

Embodiment 13: The system as in any prior embodiment, wherein the borehole string includes a magnetic field sensor, and the expected maximum pole strength is estimated to determine a distance of the downhole component from the magnetic field sensor.

Embodiment 14: The system as in any prior embodiment, wherein each magnetic field measurement is taken at a same radial direction and radial distance within the near field region.

Embodiment 15: The system as in any prior embodiment, wherein the near field region includes a surface of the downhole component.

Embodiment 16: The system as in any prior embodiment, wherein the processing device is configured to identify a first peak magnetic field value and a second peak magnetic field value from the plurality of magnetic field measurements, and estimate the magnetic signature based on a difference between the first peak magnetic field value and the second peak magnetic field value.

Embodiment 17: The system as in any prior embodiment, wherein the first magnetic field value is a maximum magnetic field value and the second magnetic field value is a minimum magnetic field value, or the second peak magnetic field value is the maximum magnetic field value and the first peak magnetic field value is the minimum magnetic field value.

Embodiment 18: The system as in any prior embodiment, wherein the processing device is configured to estimate the expected maximum pole strength by comparing the magnetic signature to magnetic field data acquired from a plurality of similar downhole components.

Embodiment 19: The system as in any prior embodiment, wherein the magnetic field data includes a reference magnetic signature for each of the similar downhole components.

Embodiment 20: The system as in any prior embodiment, wherein the processing device is configured to generate a reference curve based on the reference magnetic signatures, and estimate the expected maximum pole strength based on the reference curve.

In connection with the teachings herein, various analyses and/or analytical components may be used, including digital and/or analog subsystems. The system may have components such as a processor, storage media, memory, input, output, communications link (wired, wireless, pulsed mud, optical or other), user interfaces, software programs, signal processors and other such components (such as resistors, capacitors, inductors, etc.) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user, or other such personnel, in addition to the functions described in this disclosure.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of +8% or 5%, or 2% of a given value.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method of estimating a magnetic property of a downhole component, comprising:
    measuring a magnetic field strength of the downhole component at a plurality of axial locations along the downhole component to generate a plurality of magnetic field strength measurements, each magnetic field strength measurement taken in a near field region of the downhole component;

analyzing the plurality of magnetic field strength measurements to estimate a magnetic signature of the downhole component;

estimating an expected maximum pole strength of the downhole component based on the magnetic signature; and configuring the downhole component in a borehole string based on the expected maximum pole strength.

2. The method of claim 1, wherein the borehole string includes a magnetic field sensor, and configuring the downhole component includes positioning the downhole component at a selected distance from the magnetic field sensor based on the expected maximum pole strength.

3. The method of claim 1, further comprising deploying the borehole string and performing a subterranean operation.

4. The method of claim 1, wherein each magnetic field strength measurement is taken at a same radial direction and radial distance within the near field region.

5. The method of claim 4, wherein the near field region includes a surface of the downhole component.

6. The method of claim 1, wherein analyzing the plurality of magnetic field strength measurements includes identifying a first peak magnetic field strength value and a second peak magnetic field strength value, and estimating the magnetic signature is based on a difference between the first peak magnetic field strength value and the second peak magnetic field strength value.

7. The method of claim 6, wherein the first peak magnetic field strength value is a maximum magnetic field strength value and the second peak magnetic field strength value is a minimum magnetic field strength value, or the second peak magnetic field strength value is the maximum magnetic field strength value and the first peak magnetic field strength value is the minimum magnetic field strength value.

8. The method of claim 1, wherein the estimating the expected maximum pole strength includes comparing the magnetic signature to magnetic field strength data acquired from a plurality of similar downhole components.

9. The method of claim 8, wherein the magnetic field strength data includes a reference magnetic signature for each of the similar downhole components to generate a plurality of reference magnetic signature, each reference magnetic signature being a function of an estimated magnetic pole strength of a respective similar downhole component.

10. The method of claim 9, wherein the comparing includes generating a reference curve based on the plurality of reference magnetic signatures, and the estimating the expected maximum pole strength is estimated based on the reference curve.

11. A system for estimating a magnetic property of a downhole component, comprising:

a processing device configured to receive a plurality of magnetic field strength measurements taken along the downhole component and in a near field region of the downhole component, each magnetic field strength measurement taken at one of a plurality of axial locations along the downhole component, the processing device configured to:

analyze the plurality of magnetic field strength measurements to estimate a magnetic signature; and estimate an expected maximum pole strength of the downhole component based on the magnetic signature, the expected maximum pole strength estimated for configuring the downhole component in a borehole string.

12. The system of claim 11, wherein the downhole component is configured to be deployed in a borehole and perform a subterranean operation.

13. The system of claim 11, wherein the borehole string includes a magnetic field sensor, and the expected maximum pole strength is estimated to determine a distance of the downhole component from the magnetic field sensor.

14. The system of claim 11, wherein each magnetic field strength measurement is taken at a same radial direction and radial distance within the near field region.

15. The system of claim 14, wherein the near field region includes a surface of the downhole component.

16. The system of claim 11, wherein the processing device is configured to identify a first peak magnetic field strength value and a second peak magnetic field strength value from the plurality of magnetic strength field measurements, and estimate the magnetic signature based on a difference between the first peak magnetic field strength value and the second peak magnetic field strength value.

17. The system of claim 16, wherein the first peak magnetic field strength value is a maximum magnetic field strength value and the second peak magnetic field strength value is a minimum magnetic field strength value, or the second peak magnetic field strength value is the maximum magnetic field strength value and the first peak magnetic field strength value is the minimum magnetic field strength value.

18. The system of claim 11, wherein the processing device is configured to estimate the expected maximum pole strength by comparing the magnetic signature to magnetic field strength data acquired from a plurality of similar downhole components.

19. The system of claim 18, wherein the magnetic field strength data includes a reference magnetic signature for each of the similar downhole components, to provide a plurality of reference magnetic signatures.

20. The system of claim 19, wherein the processing device is configured to generate a reference curve based on the plurality of reference magnetic signatures, and estimate the expected maximum pole strength based on the reference curve.

* * * * *